Figure 5:
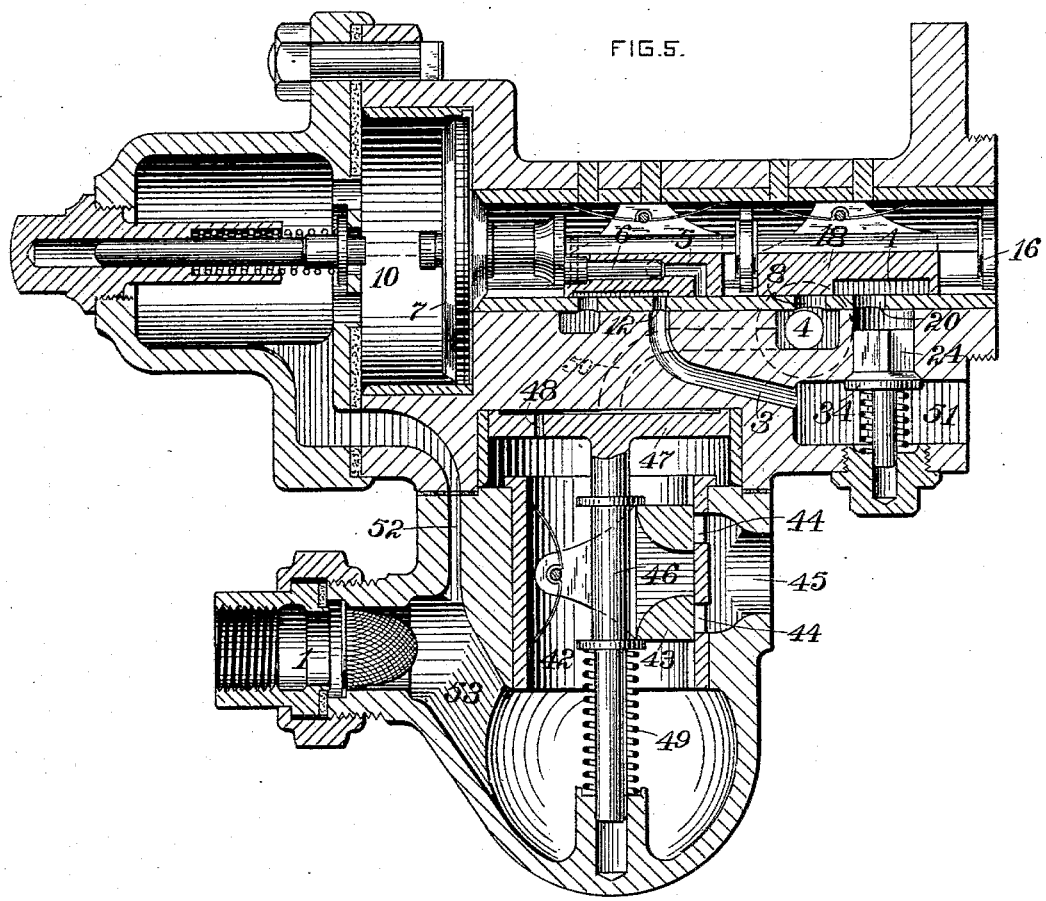

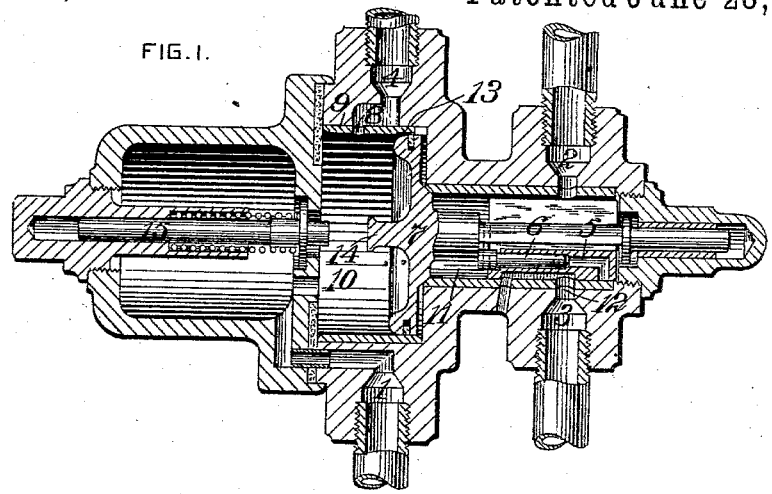

(No Model.)　　　　　　　　　　　　　　　　　　5 Sheets—Sheet 2.
R. A. PARKE.
FLUID PRESSURE BRAKE.
No. 562,773.　　　　　　　　　　　Patented June 23, 1896.
FIG. 4.
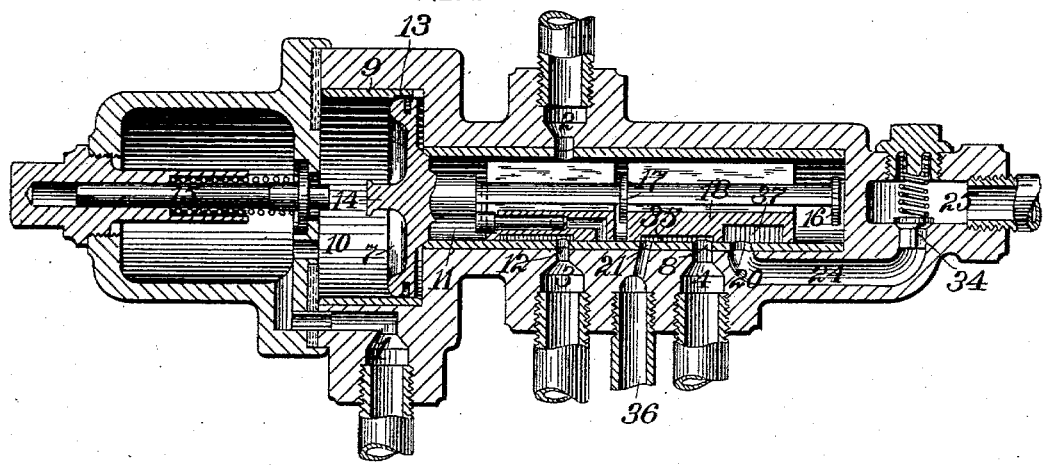
FIG. 4.a
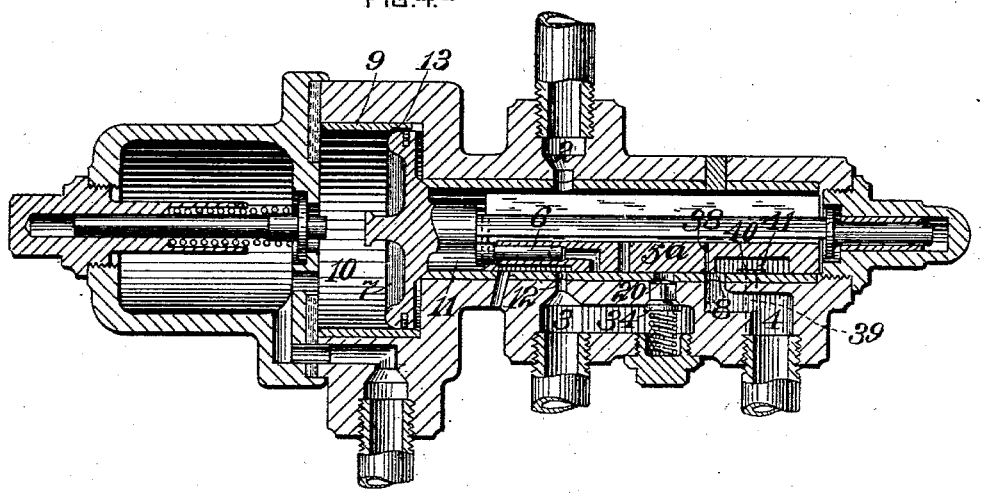
WITNESSES:　　　　　　　　　　　　　INVENTOR, (No Model.) 5 Sheets—Sheet 3.

R. A. PARKE.
FLUID PRESSURE BRAKE.

No. 562,773. Patented June 23, 1896.

WITNESSES:

INVENTOR (No Model.)  5 Sheets—Sheet 5.

R. A. PARKE.
FLUID PRESSURE BRAKE.

No. 562,773.  Patented June 23, 1896.

WITNESSES:
T. J. Hogan.
F. E. Gaither

INVENTOR,
R. A. Parke,
by J. Snowden Bell,
Att'y.

UNITED STATES PATENT OFFICE.

ROBERT A. PARKE, OF NEW BRIGHTON, NEW YORK, ASSIGNOR TO THE WESTINGHOUSE AIR BRAKE COMPANY, OF PITTSBURG, PENNSYLVANIA.

FLUID-PRESSURE BRAKE.

SPECIFICATION forming part of Letters Patent No. 562,773, dated June 23, 1896.

Application filed April 3, 1895. Serial No. 544,251. (No model.)

*To all whom it may concern:*

Be it known that I, ROBERT A. PARKE, a citizen of the United States, residing at New Brighton, in the county of Richmond and State of New York, have invented or discovered a certain new and useful Improvement in Fluid-Pressure Brakes, of which improvement the following is a specification.

The object of my invention is to provide an improvement in automatic fluid-pressure brakes for railway-trains; and to this end it consists in means whereby a discharge of fluid from a reservoir, other than the usual auxiliary reservoir or train-pipe, to the brake-cylinder, may be effected for the purpose of increasing the brake-cylinder pressure in emergency applications when, and only when, a sudden reduction of train-pipe pressure precedes the equalization of auxiliary-reservoir and brake-cylinder pressures.

In the practice of my invention I employ, in addition to the usual train-pipe, brake-cylinder, auxiliary reservoir, and plain triple valve, a quick-action release-valve for locally venting the train-pipe in emergency applications of the brakes, a subreservoir, from which fluid is discharged into the brake-cylinder in emergency applications of the brakes, and means for controlling the discharge of fluid from the subreservoir to the brake-cylinder in emergency applications, and to the train-pipe, or atmosphere, or to an expansion-chamber, or other receptacle, in service applications.

The term "subreservoir" is employed throughout the specification to indicate a reservoir additional to the auxiliary reservoir without limitation as to its size, or the degree of pressure employed therein, or its connection or relative arrangement as regards other parts of the brake system.

In service applications of the brakes the operation of my improvement is such that the fluid in the subreservoir is discharged into the train-pipe, or atmosphere, or into an expansion-chamber or other receptacle at about the same rate that the fluid in the auxiliary reservoir is discharged into the brake-cylinder, or at such a rate that the degree of pressure in the subreservoir at any time, while a service application is being made, will be approximately equal to the pressure in the auxiliary reservoir at the same time. When a full-service application has been made, and the pressures in the auxiliary reservoir and brake-cylinder have equalized, the pressure in the subreservoir will be about equal to the equalized pressure in the auxiliary reservoir and brake-cylinder, and if communication be then opened between the subreservoir and brake-cylinder no discharge of fluid from the subreservoir to the brake-cylinder will be effected, and, consequently, there will be no increase of brake-cylinder pressure above what is needed and desired for a full-service application, and no danger of locking the wheels, so as to cause them to slide on the rails.

In making an emergency application of the brakes, by means of a sudden reduction of train-pipe pressure, the operation of my improvement is such as to open communication from the subreservoir to the brake-cylinder immediately, before any reduction of pressure is effected in the subreservoir, and the fluid in the subreservoir is discharged into the brake-cylinder with the effect of causing a greater final pressure in the brake-cylinder than is desired or can be obtained in service applications.

With my improvement a service application of the brakes is effected, in the usual manner, by means of a slow or gradual release of train-pipe fluid through the engineer's brake-valve, which causes a discharge of fluid from the auxiliary reservoir to the brake-cylinder, but without any additional discharge from the subreservoir or any increase of brake-cylinder pressure except what is due to the discharge from the auxiliary reservoir to the brake-cylinder.

I employ a train-pipe release-valve under each car for locally venting the train-pipe in emergency applications of the brakes, but the only necessary function of the train-pipe release-valves is that they shall operate in emergency applications to quickly release fluid under pressure from the train-pipe under each car, and thereby produce in quick succession throughout the length of the train the effect initiated by the sudden reduction of pressure at the engineer's brake-valve.

It is not necessary that the train-pipe fluid which is released by the train-pipe release-valve should pass to the brake-cylinders. It may be released to the atmosphere or elsewhere, because, with my improvement, the additional pressure required in the brake-cylinder, in emergency applications, is obtained by discharging the fluid from the subreservoir to the brake-cylinder.

One of the principal advantages of the improvement is that the increased pressure in the brake-cylinder in emergency applications—that is, the excess above the equalized auxiliary-reservoir and brake-cylinder pressures—is obtained only by a rapid or sudden reduction of train-pipe pressure, and does not depend on the degree of the reduction, so that, in making a full-service application of the brakes, no matter how great the reduction of train-pipe pressure, there will be no discharge from the subreservoir to the brake-cylinder to increase the brake-cylinder pressure above the degree due to the equalization of the auxiliary-reservoir pressure with the brake-cylinder pressure.

Figure 6:
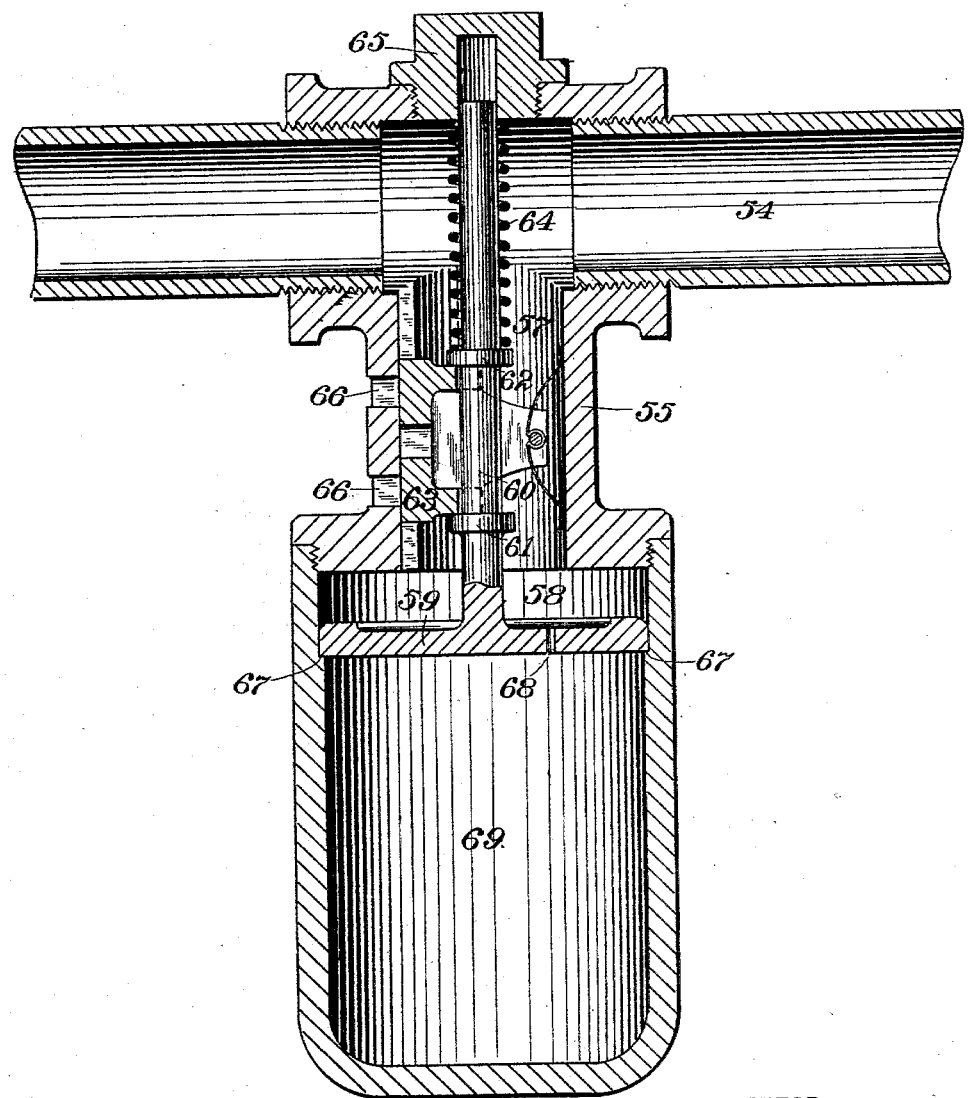

In the accompanying drawings, which illustrate applications of my improvement, Figure 1 is a longitudinal central section through a simple triple valve with my improvement applied thereto; Fig. 2, a similar view of a simple triple valve, showing a modification of my improvement in which a supplemental slide-valve is employed; Fig. 3, a modification showing my improvement in combination with a supplemental-valve device which is independent of and additional to the ordinary triple valve; Fig. 4, a modification in which a supplemental slide-valve is operated by the triple-valve piston and controls a passage to the brake-cylinder which is separate from and additional to that controlled by the triple-valve device; Fig. 4ª, a modification in which a single slide-valve is employed to perform the functions of the slide-valve of the triple-valve device and of the supplemental slide-valve shown in Figs. 2, 3, and 4; Fig. 5, a modification showing a train-pipe release-valve in combination with a triple-valve device and a supplemental slide-valve for controlling the discharge from the subreservoir; Fig. 6, a central section through a portion of the main train-pipe and through a quick-action-valve device for releasing fluid under pressure from the train-pipe, and Fig. 7 a general plan view showing the principal parts of a brake system necessary for the equipment of a single car and indicating one arrangement which may be employed in a system provided with my improvement.

In Fig. 1 of the drawings is shown an ordinary plain triple valve having a passage 1, connecting with the train-pipe, a passage 2, connecting with the auxiliary reservoir, a passage 3, connecting with the brake-cylinder, a main slide-valve 5, a graduating-valve 6, and a piston 7, all of which are common in ordinary triple-valve devices. In addition to these parts, and as forming part of my invention, I provide a port 8 in the bushing 9 of the piston-chamber 10, which port communicates with a passage 4, leading to a subreservoir. The port 8 is so located that the subreservoir is in communication with the train-pipe when the triple-valve piston 7 is in position to release the brakes, or in position to make an ordinary service application, and, when the piston 7 is moved to the limit of its stroke in full-service applications, the piston passes over and to the left of the port 8, and the subreservoir is put in communication with the brake-cylinder through the passage 4, port 8, chamber 11, port 12, and passage 3.

When the triple-valve piston 7 is in the release position, as shown in the drawing Fig. 1, the subreservoir is charged with fluid under pressure from the train-pipe through the port 8 and passage 4 at the same time that the auxiliary reservoir is being charged through the feed-groove 13. In service applications, when the piston 7 is moved to the left by a slight reduction of train-pipe pressure, so that the projection 14 on the piston bears against the end of the graduating-stem 15, and the main valve 5 and graduating-valve 6 are in position to open communication between the auxiliary reservoir and brake-cylinder, the port 8 is still in communication with the train-pipe and the fluid under pressure in the subreservoir flows into the train-pipe. The pressure in the subreservoir tends to equalize with the train-pipe pressure, and continues to reduce so long as the gradual reduction of train-pipe pressure is continued, until the auxiliary-reservoir pressure equalizes with the brake-cylinder pressure, when, if a sufficiently greater reduction of train-pipe pressure is made to move the piston to the limit of its stroke, the port 8 will be disconnected from the train-pipe and put in communication with the chamber 11, and as the subreservoir-pressure is then about equal to the auxiliary-reservoir pressure there will be no appreciable further reduction of subreservoir-pressure and no increase of brake-cylinder pressure due to the admission of fluid from the subreservoir.

Fig. 2 shows a modification in which the stem of the plain triple valve is extended and provided with an additional shoulder 16, between which and the shoulder 17 a supplemental slide-valve 18 is located, so as to be operated by the piston 7. The ordinary slide-valve 5 of the triple valve performs its usual functions, and the supplemental slide-valve 18 controls, by means of the cavity 19, the port 20, leading to the brake-cylinder, the port 8, leading to the subreservoir, and the port 21, which may lead to the atmosphere.

In service applications the supplemental slide-valve 18 establishes communication between the subreservoir and the port 21, which may lead to the train-pipe or to the atmosphere, so that, this port being properly proportioned, the subreservoir-pressure reduces at about the same rate as that of the auxiliary reservoir, and, in full-service applications, the subreservoir-pressure has become so much reduced that it does not increase the brake-cylinder pressure.

In emergency applications caused by a sudden reduction of train-pipe pressure, the further traverse of the triple-valve piston and of the supplemental slide-valve 18 establishes communication between the port 20, leading to the brake-cylinder, and the subreservoir-port 8 by means of the cavity 19, so that the fluid from the subreservoir is discharged into the brake-cylinder and with the fluid from the auxiliary reservoir causes an increased brake-cylinder pressure in emergency applications.

In Fig. 3 I have shown a valve device which may be independent of and additional to the triple-valve device. This device is in a casing separate from that of the triple-valve device, and it may be employed in combination with a plain triple valve or with a triple-valve device provided with means for locally venting the train-pipe in emergency applications. The device shown in Fig. 3 is provided with a passage 23, leading to the train-pipe, a port 8 and passage 4, leading to the subreservoir, a port 20 and passages 24 and 25, leading to the brake-cylinder, and a port 21, leading to the atmosphere or to the train-pipe. The piston 26 operates a slide-valve 18, which is provided with a passage 27, passing through it; and, when in its normal position, the piston 26 uncovers one end of a feed-groove 28, formed in the bushing 29, through which the subreservoir is charged with fluid from the train-pipe.

In service applications, caused by a moderate rate of reduction of train-pipe pressure, the piston 26 moves to the left, cutting off communication between the train-pipe and subreservoir through the feed-groove 28 and moves the slide-valve 18 to the left until, the projection 30 on the piston coming in contact with the end of the stem 31, the movement of the piston is stopped. When in this position, the port 27 in the slide-valve 18 registers with the port 21, leading to the train-pipe or to the atmosphere, and the fluid in the subreservoir is discharged into the train-pipe or into the atmosphere. By properly proportioning the port 21 the sub reservoir-pressure may be made to reduce with about the same rapidity that the auxiliary-reservoir pressure reduces, and no discharge of air from the subreservoir to the brake-cylinder can take place through a continued reduction of the train-pipe pressure at such a rate as attends service applications.

A very rapid reduction of train-pipe pressure, however, causes the piston 26 to compress the graduating-spring 32, thereby causing a sufficient further traverse of the slide-valve 18 to open a comparatively large port 20, leading from the valve-chamber 33 to the brake-cylinder, through which the fluid in the subreservoir may be quickly discharged into the brake-cylinder. A non-return valve 34, which opens toward the brake-cylinder, is employed to prevent any return of fluid from the brake-cylinder to the subreservoir when the brake-cylinder is increased by fluid from the auxiliary reservoir.

It will be seen that with this construction the final pressure in the brake-cylinder will not only be greater than the equalized auxiliary-reservoir and brake-cylinder pressures which occur in service applications or than the equalized subreservoir and brake-cylinder pressures, but it will also be greater than the pressure which might be obtained by an equalization of the auxiliary-reservoir, subreservoir, and brake-cylinder pressures, and this advantageous result is effected by the employment of the non-return valve, which prevents the return of fluid from the brake-cylinder to the subreservoir.

The subreservoir may be of such a volume, and the passages from the subreservoir to the valve-chamber, and from the valve-chamber to the brake-cylinder, so proportioned that the subreservoir shall discharge into the brake-cylinder just such an amount of air, and at just such a rate, as the train-pipe discharges into the brake-cylinder in the ordinary quick-action-brake system. The auxiliary-reservoir fluid may then be admitted to the brake-cylinder in precisely the same way that it is in the quick-action brake, and the effect obtained would be identical with that of the quick-action brake.

While the devices shown in Figs. 2 and 3 may, in service applications, discharge the subreservoir fluid into the atmosphere, it is preferred that they should discharge into the train-pipe, as thereby the rate at which the pressure of the subreservoir fluid is reduced is determined by the rate of reduction of the pressure in the train-pipe.

Fig. 4 shows a modification in which the triple-valve device and a supplemental slide-valve which controls the discharge from the subreservoir are both located in the same casing. The stem of the triple-valve piston is extended and provided with an additional shoulder or collar 16, and between the collars 16 and 17 is located the supplemental slide-valve 18, which is of such length that it is moved, by contact with the shoulder 16, only when the triple-valve piston 7 is moved to the limit of its stroke to the left, in emergency applications of the brake.

When the triple-valve piston 7 is in the release or service position, the cavity 35 in the supplemental slide-valve 18 connects the ports 8 and 21 and puts the subreservoir in communication with the train-pipe, so that when the triple-valve piston is in the release position the subreservoir will be charged with fluid from the train-pipe through the pipe 36, port 21, cavity 35, port 8, and passage or pipe 4. In service applications the subreservoir fluid will be discharged through the same passages 4, 8, 35, 21, and 36 to the train-pipe.

The full traverse of the triple-valve piston to the left, caused by a sudden reduction of train-pipe pressure to effect an emergency application of the brakes, will move the supplemental slide-valve 18 so as to cut off communication between the train-pipe and subreservoir and open communication between the subreservoir and brake-cylinder through the port 8, cavity 37, port 20, and passages 24 and 25, and thereby effect a quick discharge of fluid from the subreservoir to the brake-cylinder. A non-return valve 34, which opens toward the brake-cylinder, prevents the return of fluid from the brake-cylinder to the subreservoir, as in the construction shown in Fig. 3.

In the modification shown in Fig. 4ª a single slide-valve performs the functions of the slide-valve of the triple-valve device and of the supplemental slide-valve. Both the auxiliary reservoir and the subreservoir are charged from the train-pipe through the usual feed-groove 13 in the bushing 9, which is fitted in the triple-valve-piston chamber 10. The connection to the auxiliary reservoir is through the passage 2, which is always open to the chamber 11. When the triple-valve piston 7 is in the release position, the slide-valve 5ª is in position to connect the subreservoir with the chamber 11 by means of a passage 38, which is formed through the slide-valve, so that fluid from the train-pipe, which enters the chamber 11 through the feed-groove 13, may pass through the passage 38 and through the port 8 and passage 4 to the subreservoir.

A port 39 in the seat of the slide-valve communicates with the train-pipe, but is covered by the bridge-piece 40 when the slide-valve is in release position. In service applications the movement of the slide-valve to the left closes communication between the chamber 11 and the subreservoir through the passage 38, the bridge-piece 40 uncovers the port 39, leading to the train-pipe, and the cavity 41 in the slide-valve connects the port 8 with the port 39, so that subreservoir fluid is discharged into the train-pipe. At the same time communication is cut off between the brake-cylinder port 12 and the atmosphere, and the graduating-valve 6 is unseated to admit fluid under pressure from the auxiliary reservoir to the brake-cylinder.

When the piston 7 is moved to the limit of its stroke to the left, by a sudden reduction of train-pipe pressure, for the purpose of making an emergency application of the brakes, the slide-valve is moved so that the cavity 41 connects the port 8 with the port 20, and the subreservoir fluid is quickly discharged into the brake-cylinder through the passage 3. A non-return valve 34 prevents the return of fluid from the brake-cylinder to the subreservoir.

In Fig. 5 I have shown a modification in which the triple-valve device, the supplemental slide-valve, and the train-pipe-release device are located in the same casing. The stem of the triple-valve piston 7 is extended and provided with a shoulder or collar 16, between which and the end of the slide-valve 18 there is sufficient lost motion to avoid movement of the supplemental slide-valve by contact with the shoulder 16 in service applications of the brakes.

The train-pipe passage 1 opens into a chamber 42, in which is located a train-pipe release-valve 43, controlling the ports 44, which open into a passage 45, leading to the atmosphere. The release-valve 43 is fitted between two shoulders or collars on the stem 46 of a piston 47, which is fitted to slide in the upper part of the chamber 42, and which is held at the upper end of its stroke by means of train-pipe pressure and the pressure of a spring 49, when the triple-valve device is in position to release the brakes, or to make a service application of the brakes.

A passage 4 in the casing leads to the subreservoir and is connected by means of a passage 50 (shown in dotted lines) with the upper end of the chamber 42 above the piston 47. The subreservoir is charged with fluid from the train-pipe, which passes through a small passage 48 in the piston 47, through the passage 50, (shown in dotted lines,) and through the passage 4.

When the triple-valve piston 7 is in either the release or service position, the supplemental slide-valve 18 occupies the position shown in Fig. 5, and the port 8, leading to the subreservoir, is closed. When a comparatively slow or gradual reduction of train-pipe pressure is made, to cause a service application of the brakes, the slide-valve 5 and graduating-valve 6 operate in the usual manner to admit fluid under pressure from the auxiliary reservoir to the brake-cylinder through the port 12 and passages 3 and 51, and at the same time fluid from the subreservoir flows through the passages 4, 50, and 48, and through the chamber 42 to the train-pipe.

When a quick or sudden reduction of train-pipe pressure is made, such as is necessary to cause an emergency application of the brakes, the piston 47 will be moved down by the subreservoir-pressure acting on its upper side, the spring 49 will be compressed, and the release-valve 43 moved to open the ports 44, and thereby release the fluid from the train-pipe. The triple-valve piston 7 will be moved to the limit of its stroke to the left, but this movement will occur after the movement of the piston 47, because the cross-sectional area of the passage 52, leading to the chamber 10, is so limited that the sudden reduction of train-pipe pressure will first be effective in the chamber 42, which is connected with the train-pipe by the large passage 53. The downward movement of the piston 47, by opening the ports 44, will insure the movement of the piston 7 to the limit of its stroke.

The movement of the piston 7 to the limit of its stroke to the left will bring the shoulder or collar 17 in contact with the end of the supplemental valve 18 and move the supplemental valve to the left, so that the cavity 41 in the supplemental valve will connect the port 8 with the port 20. The fluid in the subreservoir will then be quickly discharged through the passage 4, port 8, cavity 41, port 20, and passages 24 and 51 into the brake-cylinder, and the same movement of the triple-valve piston will cause the end of the slide-valve 5 to uncover the port 12 and thereby admit fluid from the auxiliary reservoir to the brake-cylinder.

A non-return valve 34, which is located between the port 20 and the port or passage 51, prevents the return of fluid from the brake-cylinder to the subreservoir.

In Fig. 6 I have shown a train-pipe release-valve for locally venting the train-pipe under each car in emergency applications of the brakes. This or a similarly-operated device may be employed in combination with either of the constructions shown in Figs. 1, 2, 3, 4, and 4ª for the purpose of opening a comparatively large exhaust-port for the local release of fluid from the train-pipe in emergency applications of the brakes. The employment of the subreservoir for giving additional pressure in the brake-cylinder in emergency application obviates the necessity for discharging the train-pipe fluid into the brake-cylinder, and in Fig. 6 I have shown the release-valve-controlling ports which lead directly to the atmosphere.

Figure 7:
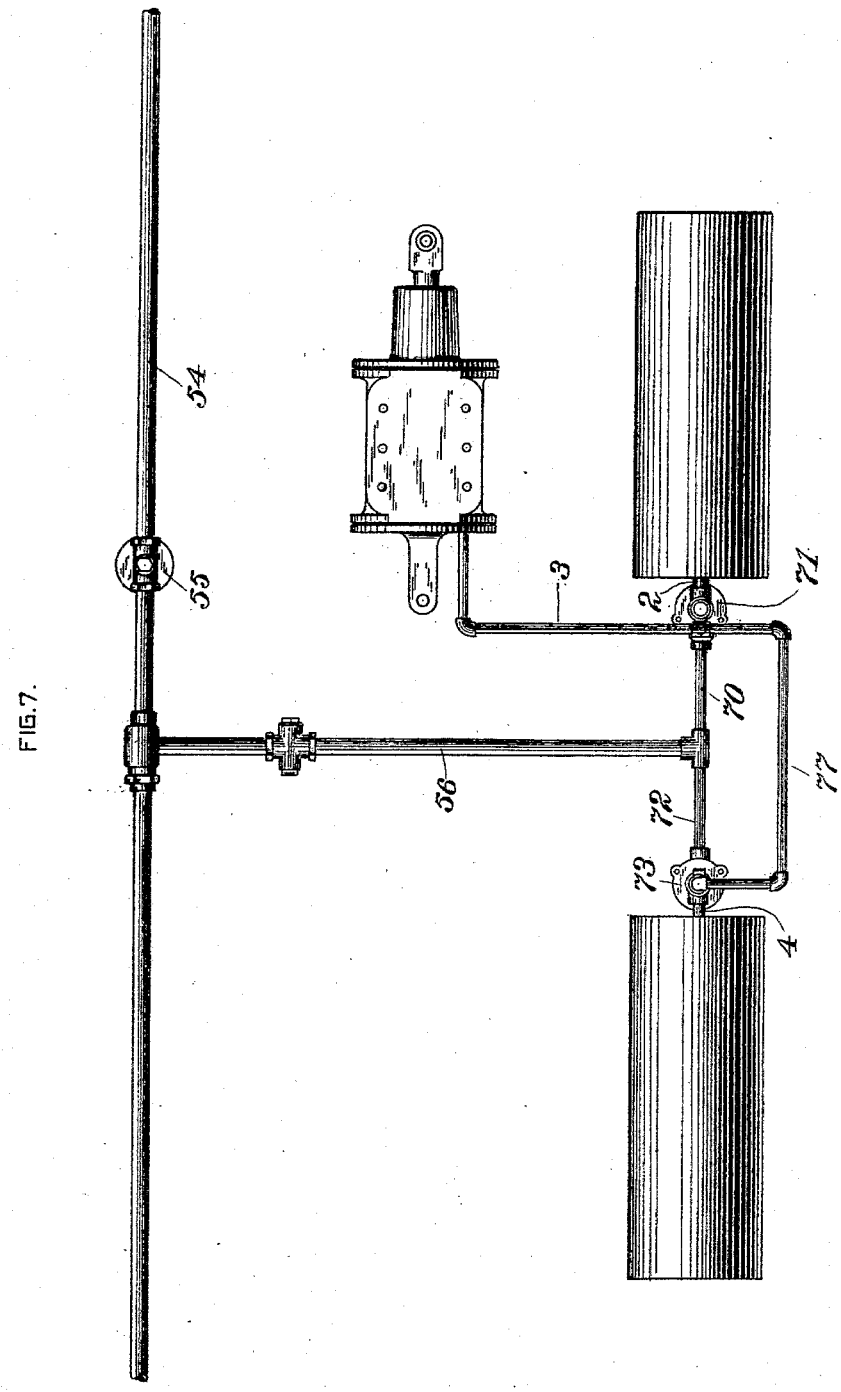

The casing 55 of the release-valve device may be connected to the train-pipe at any suitable point under each car. In Fig. 7 I have shown it connected to the main pipe 54, but, if preferred, it may be connected to the branch pipe 56. A passage 57, which also forms the valve-chamber, opens from the train-pipe into a chamber 58, in which is fitted a movable abutment or piston 59. The stem 60 of the piston 59 is provided with two collars or shoulders 61 and 62, between which the release-valve 63 is fitted, and a spring 64 surrounds the stem 60 and bears at one end against the collar 62 and at the other end against the screw-plug 65. The pressure in the train-pipe and the spring 64 tend to hold the piston 59 and the valve 63 in the positions shown in Fig. 6, so that the valve closes the ports 66 and the piston bears against a shoulder or stop 67. A small passage 68 in the piston permits the fluid from the train-pipe to pass into the space or chamber 69 until the pressures on the two sides of the piston are equalized.

In making service applications of the brakes reductions of train-pipe pressure at a moderate rate will be accompanied by a discharge of fluid from the chamber 69 into the train-pipe through the small passage 68 at such a rate that the pressure in the chamber 69, acting on one side of the piston 59 against the train-pipe pressure on the other side, will not be great enough to overcome the tension of the spring 64 and the friction of the slide-valve, and the ports 66 will remain closed.

A rapid reduction of train-pipe pressure, however, does not give time for a corresponding reduction of the pressure in the chamber 69 on account of the smallness of the passage 68, and the piston will then be moved by the pressure in the chamber 69, so as to compress the spring 64 and open the ports 66, through which the fluid in the train-pipe escapes to the atmosphere. The pressure in the chamber 69 will then be reduced by the escape of fluid into the train-pipe, through the passage 68, until the pressure in chamber 69 is low enough to permit the spring 64 to move the piston and valve 63 back into their normal positions and to close the ports 66.

In Fig. 7 I have indicated in a general plan view one arrangement of the parts which may be employed with my improvement. The train-pipe 54 is connected by branch pipes 56 and 70 with the triple-valve casing 71 and by another branch pipe 72 with the casing 73 of an independent valve device similar to that shown in Fig. 3. The casing 71 of the triple-valve device is connected by a pipe or passage 2 with the auxiliary reservoir 75 and by a pipe 3 with the brake-cylinder; and the casing 73 of the independent valve device is connected by a pipe or passage 4 with the subreservoir 76, and by the pipes 77 and 3 with the brake-cylinder. The casing 55 of a train-pipe release-valve similar to that shown in Fig. 6 is connected directly to the train-pipe 54.

When either of the devices shown in Figs. 1, 2, 4, 4ª, or 5 is employed, the valve device 73 will be omitted and the subreservoir will be connected directly to the casing 71, as indicated in those figures; and when the construction shown in Fig. 5 is employed the separate train-pipe release-valve, whose casing 55 is shown connected to the train-pipe, will also be omitted.

I claim as my invention and desire to secure by Letters Patent—

1. The combination, with a train-pipe, a brake-cylinder, and a reservoir which is normally charged with fluid under pressure, of means for controlling the discharge of fluid from the reservoir, whereby a reduction of pressure in the reservoir may be effected by a moderate rate of reduction of train-pipe pressure, without discharging the reservoir-fluid to the brake-cylinder, and whereby the fluid in the reservoir may be discharged to the brake-cylinder by a sudden, or rapid, reduction of train-pipe pressure, substantially as set forth.

2. The combination, with a train-pipe, a brake-cylinder, and a reservoir which is normally charged with fluid under pressure, of means whereby the fluid in the reservoir may be discharged into the brake-cylinder by a sudden, or rapid, reduction of train-pipe pressure, and elsewhere than to the brake-cylinder, by a moderate rate of reduction of train-pipe pressure, substantially as set forth.

3. The combination, with a train-pipe, a brake-cylinder, and a triple-valve device, of two reservoirs, and means whereby a discharge of fluid is effected from one of the reservoirs to the brake-cylinder, and from the other reservoir, elsewhere than to the brake-cylinder, on a gradual reduction of train-pipe pressure, and from both reservoirs to the brake-cylinder on a sudden, or rapid reduction of train-pipe pressure, substantially as set forth.

4. The combination, with a train-pipe, a brake-cylinder, a triple-valve device, and an auxiliary reservoir of a subreservoir which is normally charged with fluid under pressure, and means whereby a release of fluid from the subreservoir is effected by a gradual reduction of train-pipe pressure through a passage, or passages disconnected from the brake-cylinder, substantially as set forth.

5. The combination, with a train-pipe, a brake-cylinder, and a triple-valve device, of two reservoirs, one of which discharges fluid into the brake-cylinder, and the other elsewhere than to the brake-cylinder on a preliminary traverse of the triple-valve piston, and both of which discharge fluid into the brake-cylinder on the further traverse of the triple-valve piston, substantially as set forth.

6. The combination, with a train-pipe, a brake-cylinder, a triple valve, and an auxiliary reservoir, of a subreservoir which is normally charged with fluid under pressure, means for discharging the fluid from the subreservoir to the brake-cylinder, in emergency applications of the brake, for the purpose of increasing the brake-cylinder pressure, and for reducing the subreservoir-pressure in service applications of the brake to prevent an increase of pressure in the brake-cylinder, by a discharge of fluid from the subreservoir, when communication is established between the subreservoir and brake-cylinder in service applications of the brake, substantially as set forth.

7. The combination, with a train-pipe, a brake-cylinder, and a reservoir which is normally charged with fluid under pressure, of means for controlling the discharge of fluid from the reservoir, whereby a gradual or moderate rate of reduction of train-pipe pressure is effected without a discharge of fluid from the reservoir to the brake-cylinder regardless of the extent of such reduction, and a sudden or rapid reduction of train-pipe pressure effects a discharge of fluid from the reservoir to the brake-cylinder, substantially as set forth.

8. The combination, with a train-pipe, a brake-cylinder, and a subreservoir, of means for quickly discharging fluid under pressure from the subreservoir to the brake-cylinder in emergency applications of the brakes and an imperforate non-return valve for preventing the return of fluid from the brake-cylinder to the subreservoir, substantially as set forth.

9. The combination, with a train-pipe, a brake-cylinder, an auxiliary reservoir, and a subreservoir, of means whereby a sudden or rapid reduction of train-pipe pressure effects a discharge of fluid from the subreservoir to the brake-cylinder, an imperforate non-return valve, which prevents the return of fluid from the brake-cylinder to the subreservoir, and means whereby fluid in the auxiliary reservoir discharges into the brake-cylinder after the discharge from the subreservoir, substantially as set forth.

10. The combination, with a train-pipe, a brake-cylinder, an auxiliary reservoir, and a subreservoir, of means whereby a moderate rate of reduction of train-pipe pressure is effected without a discharge of fluid from the subreservoir to the brake-cylinder, regardless of the extent of such reduction, and a sudden or rapid reduction of train-pipe pressure effects a quick discharge of fluid from the subreservoir to the brake-cylinder, a non-return valve, which prevents the return of fluid from the brake-cylinder to the subreservoir, and means whereby the fluid in the auxiliary reservoir discharges into the brake-cylinder after the discharge from the subreservoir, substantially as set forth.

In testimony whereof I have hereunto set my hand.

ROBERT A. PARKE.

Witnesses:
T. J. HOGAN,
W. B. CORWIN.